United States Patent [19]

McSweeney

[11] Patent Number: 4,858,066
[45] Date of Patent: Aug. 15, 1989

[54] NONLINEAR DIELECTRIC CAPACITOR FOR PULSE GENERATION APPLICATIONS

[75] Inventor: Robert T. McSweeney, Wakefield, Mass.

[73] Assignee: GTE Products Corporation, Danvers, Mass.

[21] Appl. No.: 288,740

[22] Filed: Dec. 22, 1988

[51] Int. Cl.$^4$ .......................... H01G 4/12; C04S 35/00
[52] U.S. Cl. ...................................... 361/321; 501/135
[58] Field of Search ............... 252/62.2; 501/134, 135; 361/321

[56] References Cited

U.S. PATENT DOCUMENTS

| | | | |
|---|---|---|---|
| 3,490,887 | 1/1970 | Herczog et al. | 65/33 |
| 3,569,795 | 3/1971 | Gikow | 361/321 X |
| 3,699,620 | 10/1972 | Asher et al. | 29/25.42 |
| 3,900,773 | 8/1975 | Bowkley et al. | 361/321 X |
| 4,360,762 | 11/1982 | Yamamoto et al. | 361/321 X |
| 4,379,319 | 4/1983 | Wilson | 501/134 X |
| 4,404,029 | 9/1983 | Iwaya et al. | 501/139 |
| 4,430,689 | 2/1984 | Lagrange et al. | 361/321 |
| 4,447,549 | 5/1984 | Masujima et al. | 501/138 |
| 4,477,401 | 10/1984 | Hagemann et al. | 264/61 |
| 4,484,251 | 11/1984 | Masujima et al. | 361/321 |
| 4,488,087 | 12/1984 | Adachi et al. | 315/101 |
| 4,513,227 | 4/1985 | Labadini et al. | 315/590 |
| 4,517,496 | 5/1985 | Adachi et al. | 315/227 R |
| 4,520,294 | 5/1985 | Iida et al. | 315/50 |
| 4,555,494 | 11/1985 | Nishida et al. | 501/135 X |
| 4,647,819 | 3/1987 | Wyner et al. | 315/241 R |
| 4,712,156 | 12/1987 | Bardhan | 361/321 |
| 4,749,668 | 6/1988 | Fujino et al. | 501/134 |
| 4,753,905 | 6/1988 | Nishioka et al. | 501/134 X |

FOREIGN PATENT DOCUMENTS

| | | |
|---|---|---|
| 2949074 | 11/1981 | Fed. Rep. of Germany . |
| 136150 | 7/1985 | Japan . |
| 136151 | 7/1985 | Japan . |
| 2066801 | 11/1980 | United Kingdom . |

OTHER PUBLICATIONS

Matsuyama et al., "Pulse-Like Voltage Generation Using Polarization Reversal of Ferroelectric Ba-Substituted Pb(Zr, Ti)O$_3$ Ceramics", Japan Journal Applied Physics, vol. 16, pp. 1871–1872 (1977).

Philips Laboratories, "Ferroelectric Capacitors for Discharge Lamp Ballast Circuits", Ferroelectrics, vol. 27, pp. 281–291 (1980).

Philips Laboratories, "Nonlinear Capacitors Improve the Performance of Saturable Lead Ballasts", Journal of IES, pp. 122–125, Apr. 1979.

*Primary Examiner*—Donald A. Griffin
*Attorney, Agent, or Firm*—Martha Ann Finnegan

[57] ABSTRACT

An improved nonlinear dielectric element for use in ferroelectric ceramic capacitors is disclosed which exhibits higher operating temperatures and lower coercive field levels than the compositions presently in use. This new composition is based upon Pb(Mg$_{0.33}$Nb$_{0.67}$)O$_3$ as described by the general formula $$u[Pb(Mg_{0.33}Nb_{0.67})O_3]+v[PbTiO_3]+w[Pb(Me_{0.50}W_{0.50})O_3],$$

wherein u, v and w denote mole fractions, and Me represents a metal ion having a +2 valence such as Mg, Zn or Ni. In a preferred embodiment, u≧0.65, v≦0.35 and w≦0.033.

7 Claims, 8 Drawing Sheets

VOLTAGE

P38a / C260 / 0.68 mm thickness

FIG.5a

VOLTAGE

P39a / C260 / 0.060 mm thickness

FIG.5b

VOLTAGE

P49a / C270 / 0.58 mm thickness

FIG.5c

VOLTAGE

P52a / C270 / 0.60 mm thickness

NONLINEAR DIELECTRIC CAPACITOR FOR PULSE GENERATION APPLICATIONS

BACKGROUND OF THE INVENTION

1. Field of the Invention

The present invention relates to nonlinear dielectric elements (NLDE), and in particular ferroelectric ceramic capacitors utilized in high voltage pulse generating circuits for the ignition of discharge lamps or the like. High voltage pulses can be generated using a simple circuit consisting of a ferroelectric ceramic capacitor in series with a standard lamp ballast or an inductor having a good high frequency response. The discharge lamp is placed in parallel with the capacitor or NLDE. The pulse generating capability of the circuit is due to the polarization hysteresis loop generated by the NLDE in its ferroelectric state.

Each time the capacitor is driven into polarization saturation, a voltage pulse is created. The series inductance of the lamp ballast amplifies the pulse created by the polarization saturation, but because the impedance of the capacitor is much greater than that of the inductance, most of the pulse voltage appears across the capacitor. These voltage pulses can then be used to ignite specific types of discharge lamps connected in parallel with the capacitor.

The magnitude of the generated pulse is directly proportional to: (1) the remanent charge, i.e., the polarization value multiplied by the electrode area; (2) the slope of the polarization versus electric field response curve near the coercive field points, i.e., loop squareness; and (3) the applied voltage. Higher remanent charge levels, due either to increases in electrode area or higher remanent polarization levels, result in larger peak pulse voltages. Similarly, squarer polarization versus electric field behavior causes a greater change in the displacement current when the NLDE is driven into polarization saturation, also resulting in larger peak pulse voltages. Since the applied voltage cannot be varied in a standard lamp circuit, the first two factors will determine how well the NLDE will perform under specific temperature and voltage conditions.

The pulse behavior of the circuit therefore primarily depends upon the polarization behavior of the non-linear dielectric element. This performance can be improved by improving the size and shape of the polarization loop generated by the NLDE. The most significant factors defining the hysteresis behavior of the NLDE are its remanent polarization level, coercive field level and loop squareness. In addition the device should be capable of operating at as high a temperature as possible, and should be capable of withstanding the pulse that it generates without suffering dielectric breakdown. The polarization loop characteristics and other associated dielectric properties thus define the applicability of various ferroelectric materials for lamp ignitor applications. To be useful, the ferroelectric device should have a low coercive field value, a high remanent polarization, high dielectric strength, a high curie temperature and very square polarization versus voltage loop shape.

2. Description of the Prior Art

Prior nonlinear dielectric elements have been based either on $BaTiO_3$ modified with up to 15 m/o of $BaZrO_3$ or $BaSnO_3$ or on $Pb(ZrTi)O_3$ modified with $BaTiO_3$ or $SrTiO_3$. Both materials systems have significant shortcomings.

In the case of the modified $BaTiO_3$, the Curie temperatures are limited to 90° C. and the maximum remanent polarization level is limited to 0.20 $C/m^2$ by intrinsic material characteristics. In spite of these limitations, very high voltage pulses can be generated below 70° C. using a $Ba(Ti_{0.915}Zr_{0.085})O_3$-based composition. The pulse voltage level is decreased by 50% and the range of operation is extended to 85° C. if the $BaZrO_3$ content is decreased to 5 m/o.

Much higher temperature operating ranges are possible using $(Pb_{1-x}Ba_x)(Zr_{1-y}Ti_y)O_3$ compositions. The Curie temperature range available in this system can be adjusted from above 300° C. to below room temperature by adjusting the values of x and y. The major shortcoming of this materials system is the high level of coercive field inherent in PZT-based NLDE's, typically 10 KV/cm at room temperature. Materials having higher coercive field values have to be made thinner to allow their polarization loops to be opened by the applied voltage, and this reduced thickness makes them more susceptible to dielectric breakdown.

SUMMARY OF THE INVENTION

The present invention is intended to overcome the above-noted shortcomings by providing a nonlinear dielectric element for use as a dielectric in ferroelectric ceramic capacitors based on $Pb(Mg_{0.033}Nb_{0.67})O_3$ which exhibits higher operating temperatures than can be obtained using $Ba(Ti,Zn)O_3$-based or $Ba(Ti,Sn)O_3$-based ceramic compositions. In addition, these new materials have lower coercive field levels than ferroelectric ceramic capacitors based in $Pb(Zr,Ti)O_3$, a materials system having a similar range of temperature operation. Because of these features, parts made from the new compositions can be made thicker than prior compositions and can be fired to near theoretical density using conventional pressureless sintering methods in place of hot-pressing techniques.

These new compositions are based upon the general chemical formula:

$$u[Pb(Mg_{0.033}Nb_{0.67})O_3] + v[PbTiO_3] + w[Pb(Me_{0.50}W_{0.50})O_3],$$

wherein u, v and w denote mole fractions of the stated compounds, and Me represents a metal ion having a +2 valence, such as Mg, Zn or Ni.

DETAILED DESCRIPTION OF THE PREFERRED EMBODIMENTS

Figure 1A:
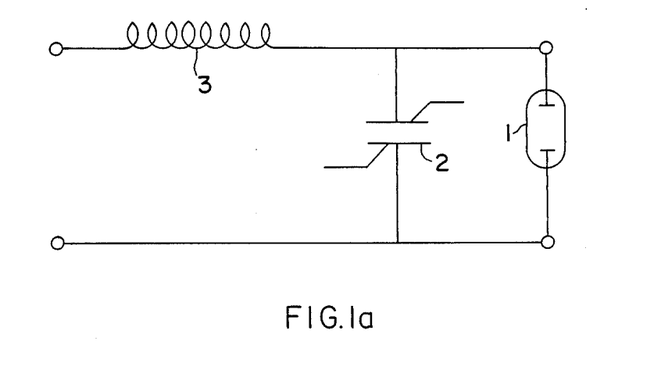
FIG. 1a shows a basic discharge lamp ignition circuit utilizing the non-linear dielectric element of the invention.
Figure 2A:
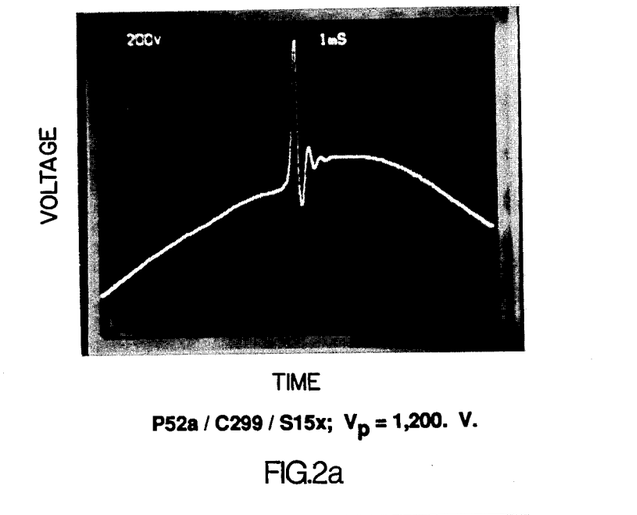
FIGS. 2a–2d show oscilloscope traces of the voltage pulses generated by the circuits of FIGS. 1a and 1b for several inventive compositions.
Figure 2B:
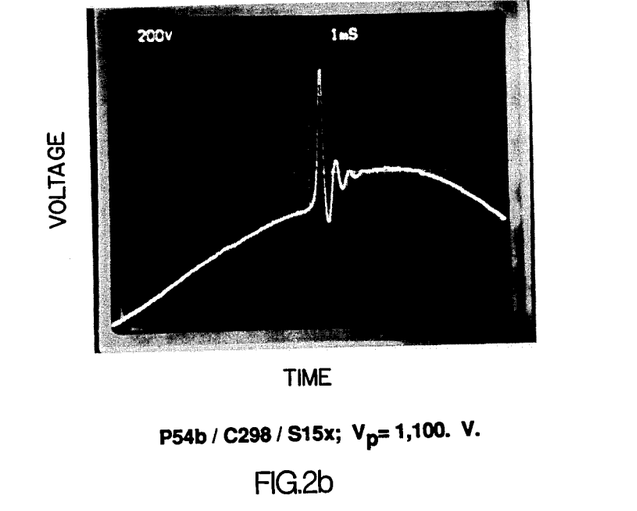
Figure 2C:
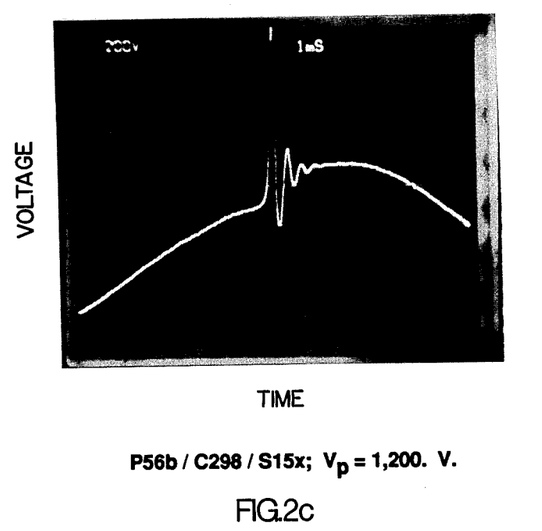
Figure 2D:
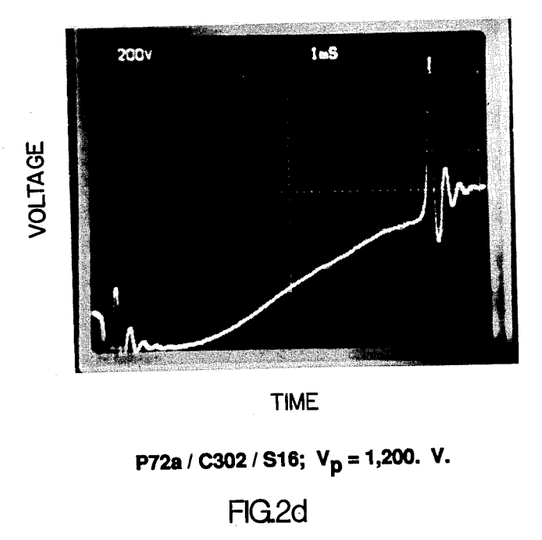

Referring to FIG. 1a, high voltage pulses capable of igniting a discharge lamp 1 can be generated by placing a nonlinear dielectric element (NLDE), in this case ferroelectric ceramic capacitor 2, in parallel with the lamp and in series with a standard lamp ballast or inductor 3 having a good high frequency response. Pulses can be generated using this circuit provided that the following conditions are met: (1) the inductor 2 must exhibit high inductance levels of about 0.3H at frequencies near that of the fundamental frequency component of the generated pulse, i.e., about 10 MHz; (2) the NLDE (capacitor 2) must be in a ferroelectric temperature region, preferably about 25° C. or more below its Curie temperature; (3) the NLDE must have a very square electric polarization versus electric field hysteresis loop; (4) the NLDE must have a high level of remanent polarization; and, (5) sufficient voltage must drop across the NLDE to open its polarization loop. Voltage pulses similar to that shown in FIGS. 2a to 2d superimposed on the applied AC voltage will be generated every half cycle of applied voltage frequency when these conditions are met. These voltage pulses correspond to the respective compositions recited in Table 1 herein. In particular, FIG. 2a is with respect to composition P52a, FIG. 2b is with respect to composition P54b, FIG. 2c is with respect the composition P56b, and FIG. 2d is with respect to composition P72a.

Figure 3:
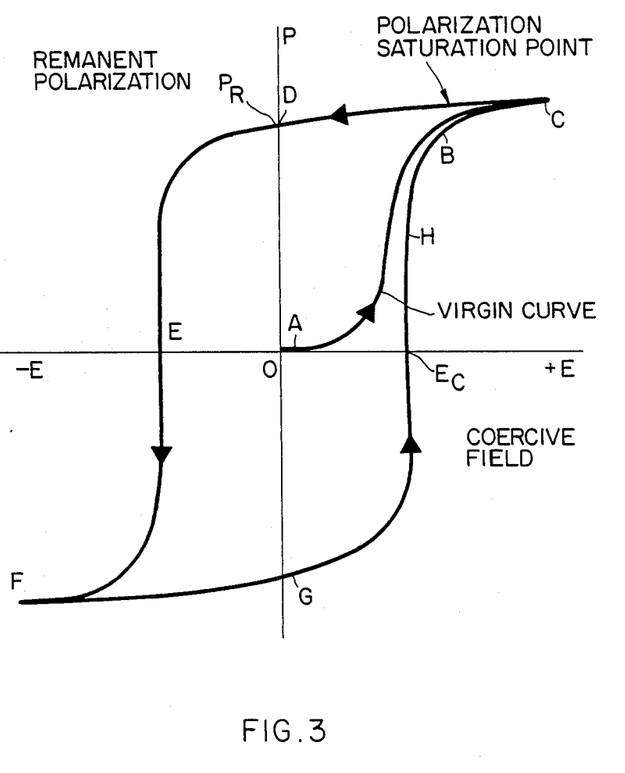
FIG. 3 illustrates the polarization versus voltage hysteresis loop for a ferroelectric nonlinear dielectric element.

The pulse generating capability of the circuit shown in FIG. 1a is due to the polarization hysteresis loop generated by the NLDE in its ferroelectric state, as illustrated in FIG. 3. This nonlinear polarization behavior is due directly to electric field-induced domain switching. Cooling a ferroelectric material through its Curie temperature initially results in a random domain configuration having no net polarization direction. When a voltage is initially applied to the opposing electrode surfaces, the domains will align to create an internal field and thus counteract the applied electric field. At low applied field levels, none of the domains is able to respond to the applied voltage and the ferroelectric behaves like a linear dielectric. Beyond a certain threshold field value, a polarization loop such as that shown in FIG. 3 is created.

The formation of a polarization loop under steady state AC excitation indicates that domains are changing their polarization direction to oppose the applied field. At intermediate field levels, many of the domains are able to reorient in response to the increasing field level, or alternatively, more favorably oriented domains may grow at the expense of the unfavorably aligned ones. When most of the available domains have been switched to as near to the field direction as possible, polarization saturation has occurred, as indicated by path A-B in FIG. 3. Further increases in the electric field produce only small changes in polarization as shown in path B-C, and will eventually cause destructive dielectric breakdown if continued.

If the applied voltage and thus the electric field are now reduced to zero, only a fraction of the domains will switch away from the orientation induced by the applied field, following path C-D. The material will remain polarized, and the amount of charge per unit area remaining on the surface is termed the remanent polarization ($P_r$). The spontaneous polarization ($P_s$) is similarly defined by extrapolating the polarization in the saturation region back to zero field. In ferroelectrics with very square polarization characteristics, the $P_r$ and $P_s$ levels are nearly equal.

Reversing the polarity of the applied voltage causes some of the domains to reorient as the voltage is increased so that their internal polarization vectors again oppose the field direction. At a sufficiently high enough reverse field strength, designated the coercive field ($-E_c$), the polarization is reduced to zero, following path D-E in FIG. 3. Further increases in voltage in the negative direction result in polarization saturated with reverse polarity, as shown by path E-F. Returning the applied voltage to zero along path F-G leaves the material in the oppositely polarized state with a net polarization value $-P_r$.

Returning to the initial positive applied voltage sense and increasing the voltage causes the polarization to again decrease to zero at point $E_c$, followed by positive polarization saturation along path G-H. The polarization versus field (P-E) curve of the ferroelectric will continue to follow the hydsteries path B-C-E-F-G-H on repeated cycling using an applied sinusoidal or sawtooth voltage provided the temperature of the sample remains constant.

The dynamic capacitance and associated displacement current density of a ferroelectric are defined by the slopes of the P-E loop sections and, as observed in FIG. 3, these slopes are quite different for different sections of the hysteresis loop. In either the positive or negative saturated states, along the horizontal portions of the loop, the dynamic capacitance is low since the change in polarization or charge per unit area with a change in voltage is low. In these low dynamic capacitance regions the displacement current density is also low. However, along the vertical loop sections, near the coercive voltage points E and $E_c$, a very large dynamic capacitance is observed. Over these vertical sections large changes in polarization are noted with relatively small changes in voltage. This large dynamic capacitance implies that a large displacement current density exists in this region of the polarization curve.

The square hysteresis loops obtained in certain ferroelectric materials generate voltage pulses when the NLDE is placed in series with a sufficiently large inductance because of the large differences in displacement current associated with the horizontal and vertical portions of the polarization loop. The voltage at which saturation occurs marks a sudden change in the displacement current density, I, from a high value to a low value. Since the change in this current with time, dI/dt, multiplied by any series parasitic inductance defines the voltage $V_p$ across the series combination by the relationship $$V = L \, dI/dt,$$

a voltage pulse is created each time the nonlinear dielectric capacitor is driven into polarization saturation. Any deliberately introduced series inductance acts to amplify the voltage pulse created by the polarization saturation, but, because the 60 Hz impedance of the capacitor is much greater than that of most realizable series inductances, most of the pulse voltage appears across the capacitor. These voltage pulses can then be used to ignite certain types of discharge lamps connected in parallel with the capacitor. This is the basic circuit shown in FIG. 1a.

Figure 1B:
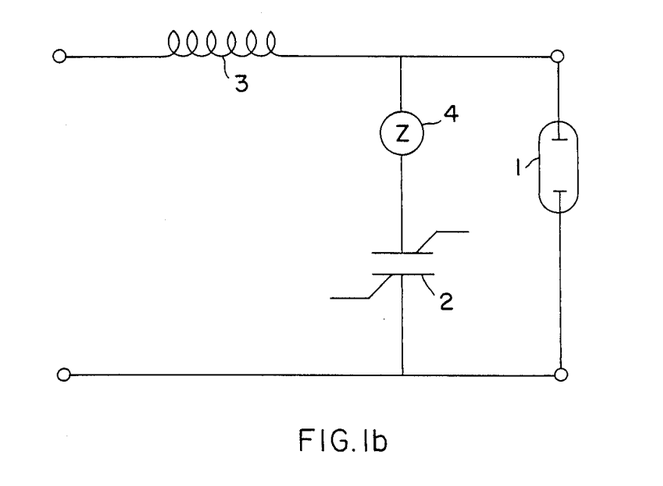
FIG. 1b shows a similar ignition circuit including a voltage activated silicon switch to increase voltage pulse levels.

If higher pulse levels are required to ignite a specific discharge lamp, the capacitor 2 can be placed in series with a voltage activated silicon switch 4, as illustrated in FIG. 1b, and the same factor governing the pulse generating capabilities of an NLDE will still apply.

It has been discovered that NLDE's based upon materials in the $Pb(Mg_{0.33}Nb_{0.67})O_3$—$PbTiO_3$—$Pb(Me_{0.50}W_{0.50})O_3$ system, where Me is Mg, Zn or Ni, have extremely useful properties for pulse generating applications. Very square polarization hysteresis loops having high remanent polarization levels, relatively low coercive field levels and high Curie temperatures can be produced with various combinations of the above lead-based compounds. The general chemical formula for compositions in this system is written as:

$$u[Pb(Mg_{0.33}Nb_{0.67})O_3] + v[PbTiO] + w[Pb(Me_{0.50}W_{0.50})O_3],$$

wherein M, V, and W denote the mole fractions of the stated compounds. The expression $u+v+w=1.000$ must, therefore, hold. The symbol Me represents a metal ion having a +2 valence, such as Mg, Zn or Ni.

A series of compositions having different values of u, v and w were prepared using standard ceramic processing techniques. Since the desired crystal structure is that of a distorted perovskite based on the chemical formula $ABO_3$, the proper concentrations of the component metal oxides or alternative precursors should ideally be blended to attain an A/B concentration ratio of 1.000 to avoid the presence of additional crystal phases. Alternatively, this ratio can be represented as the ratio concentration of large cations to the concentration of small cations. Large cations are defined as those elements having ionic radii greater than 0.10 nm such as $Pb^{+2}, Ba^{+2}$ or $Sr^{+2}$, and small cations such as $Mg^{+2}, Nb^{+5}, Zn^{+2}, Ni^{+2}, W^{+6}$ and $Ti^{+4}$ have ionic radii less than 0.10 nm. Composition prepared to illustrate this invention, however, were designed to have a slight excess of PbO, i.e., a Large/Small (L/S) ratio of 1.015 to 1.030, to compensate for the PbO lost by vaporization during sintering and thus attain a L/S ratio near 1.000 after sintering.

The small cation-based oxides or oxide precursors including $Nb_2O_5$, $MgCO_3$, $TiO_2$ and ammonium para-tungstate (APT), prepared with or without NiO or ZnO, were premixed and calcined prior to blending with PbO, following the preferred mixing sequence known in this art. These components are typically ball mill blended for 24 hours, dried, crushed, sieved and calcined at 1050° C. to 1150° C. for 18 hours—after crushing and sieving, the thermally reacted small cation component mixtures are mixed with the proper amount of PbO to provide an initial L/S ratio of between 1.000 and 1.030 and again ball milled for 24 hours. After drying, crushing and sieving, the mixture is calcined at 925° C. to 950° C. for 4 to 18 hours to form the desired crystal structure. These reacted materials are then blended with 5 to 10 m/o of an organic binder or combination of binders such as microcrystalline cellulose and polyethylene glycol and ball milled for 20 to 24 hours.

The ferroelectric ceramic capacitors are prepared from the final milled powders using standard ceramic processing and finishing techniques. After crushing and sieving, the compositions are pressed into disk-shaped pieces having diameters of about 17 mm and thicknesses of 0.60 to 0.85 mm by uniaxial pressing at 50 to 300 MPa. Organic binders are removed in an open presintering firing at temperatures up to 900° C. so that the disks can be fired in a covered container without subjecting them to reducing conditions resulting from binder pyrolysis. The PMN-PT based parts are sintered under inverted alumina crucibles to minimize PbO losses. The sintering temperatures range from 1185° C. to 1260° C. for times between 0.5 and 24 hours. The disks are separated from each other using spacers composed of $PbZrO_3$, $BaTiO_3$, PbO and PMN-PT to prevent their sticking to each other, and firings are performed with additional amounts of $PbZrO_3$ present in pellet form to reduce PbO losses from the disks. After firing, their diameters are about 14.5 mm and their thicknesses from 0.45 to 0.75 mm.

The sintered parts are supplied with screen printed silver electrodes being commercial electrodes inks. The printed electrodes are fired on at temperatures between 800° C. and 925° C. Leads are soldered onto the electrode surfaces using a standard 60/40 Pb/Sn solder. All parts are encapsulated using a phenolic coating, which coating is effective in preventing arcing at the electrode edges, thus allowing the parts to reach their maximum possible pulse outputs.

The composition formulas, room temperature polarization parameters and Curie temperatures for all of the materials made are summarized in Table I.

TABLE I

PMN—PT Compositions:
$u\ Pb(Mg_{0.33}Nb_{0.67})O_3 + v\ PbTiO_3 + w\ Pb(Me_{0.50}W_{0.50})O_3$

| Comp. No. | u PMN (mole fraction) | v PT (mole fraction) | w PMeW (mole fraction) | MeO | Calcine Temp °C. | Calcine Time-hr | Initial L/S | $E_c$ (KV/cm) | $P_r$ (coul/m$^2$) | $T_c$ (°C.) |
|---|---|---|---|---|---|---|---|---|---|---|
| P37a | 0.75 | 0.25 | 0.00 | na | 900 | 5 | 1.013 | 3.6 | .31 | 120. |
| P38a | 0.70 | 0.30 | 0.00 | na | 900 | 5 | 1.013 | 3.6 | .31 | 145. |
| P39a | 0.65 | 0.35 | 0.00 | na | 900 | 5 | 1.013 | 5.1 | .26 | 185. |
| P49* | 0.700 | 0.300 | 0.00 | na | 900/925 | 5/18 | 1.015 | 4.–5. | .30 | 145. |
| P52a* | 0.675 | 0.295 | 0.030 | MgO | 900/925 | 5/18 | 1.015 | 4.–5. | .32 | 132.5 |
| P52b | 0.675 | 0.295 | 0.030 | MgO | 900/925 | 5/18 | 1.015 | 4.–5. | .32 | 132.5 |
| P54a | 0.667 | 0.300 | 0.033 | ZnO | 925 | 18 | 1.015 | 4.–5. | .34 | 142.5 |
| P54b | 0.667 | 0.300 | 0.033 | ZnO | 925 | 18 | 1.020 | 4.–5. | .34 | 142.5 |
| P56a | 0.667 | 0.300 | 0.033 | NiO | 925 | 18 | 1.015 | 4.–5. | .34 | 131.5 |
| P56b | 0.667 | 0.300 | 0.033 | NiO | 925 | 18 | 1.015 | 4.–5. | .34 | 131.5 |
| P68a | 0.642 | 0.325 | 0.033 | NiO | 940 | 12 | 1.020 | 5.–6. | .34 | 142.5 |
| P69a | 0.642 | 0.325 | 0.033 | ZnO | 940 | 12 | 1.020 | 5.–6. | .34 | 155.0 |
| P70a | 0.617 | 0.350 | 0.033 | ZnO | 940 | 12 | 1.020 | nm | nm | 175.0 |

TABLE I-continued

PMN—PT Compositions:
u Pb(Mg$_{0.33}$Nb$_{0.67}$)O$_3$ + v PbTiO$_3$ + w Pb(Me$_{0.50}$W$_{0.50}$)O$_3$

| Comp. No. | u PMN | v PT | w PMeW | MeO | Calcine Temp °C. | Calcine Time-hr | Initial L/S | $E_c$ (KV/cm) | $P_r$ (coul/m$^2$) | $T_c$ (°C.) |
|---|---|---|---|---|---|---|---|---|---|---|
| | (mole fraction) | | | | | | | | | |
| P71a | 0.617 | 0.350 | 0.033 | NiO | 940 | 12 | 1.020 | nm | nm | (160.0) |
| P72a | 0.642 | 0.325 | 0.033 | MgO | 940 | 12 | 1.020 | 5.-6. | .34 | (147.5) |
| P73a | 0.617 | 0.350 | 0.033 | MgO | 940 | 12 | 1.020 | nm | nm | (165.0) |
| P74a | 0.642 | 0.325 | 0.033 | mixed | 940 | 12 | 1.020 | 5.-6. | .34 | 147.5 | nm — not measured, na — not added
*Initial L/S value attained with Pb acetate addition
Change in L/S due to post calcine addition is +0.025
( ) - estimated from above data.

The basic composition is described by the simplified materials system which results when w=0.000. In this case, higher Curie point compositions are defined by PMN and PT mole fractions in the ranges of $0.65 \leq u \leq 0.75$ and $0.25 \leq v \leq 0.35$. As the value of v is increased from 0.25 to 0.35, the Curie temperature increases from 120° C. to 185° C. Near PbTiO$_3$ concentrations of 65 m/o and above, v>0.35, the crystal structure changes from that of a rhombohedral distorted perovskite to a tetragonally distorted form. Accompanying this change in crystal structure is a decrease in the number of polarization axes from 8 to 6 and an associated, detrimental increase in the coercive field level. For this reason, the preferred compositions have PT mole fractions in the range of $0.25 \leq v \leq 0.35$, with the preferred composition being as close to 0.35 as possible without causing a change in crystal structure.

The more complex compositions prepared with w=0.033 and using either Mg, Zn or Ni as the lower valence component of the PMeW modifier provides a means for lowering the sintering temperature and increasing grain growth at a given sintering temperature. The tungsten is supplied using ammonium paratungstate and the divalent metals are added as oxides. The same small cation premixing step and standard milling procedures are used with these compositions.

Relative permittivities for the various compositions were calculated from the measured capacitance, specimen and electrode dimensions.

Figure 4:
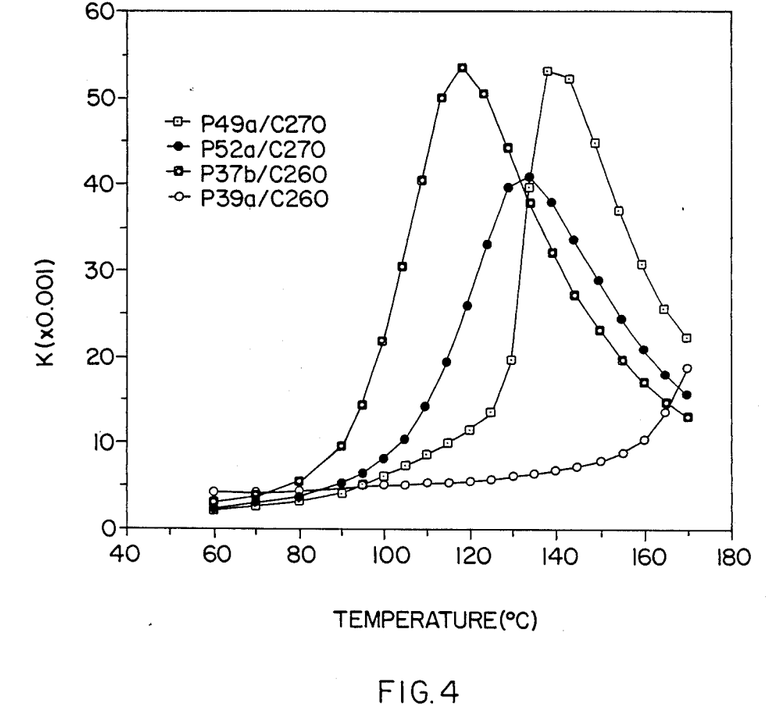
FIG. 4 is a graph plotting relative permittivity versus temperature for four of the specific compositions of the invention.
Figure 5A:
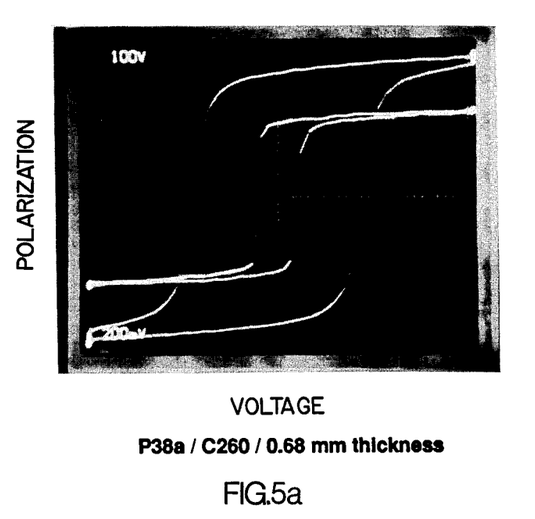
FIGS. 5a–5d show oscilloscope traces of the polarization versus voltage hysteresis loops for capacitors prepared from several of the inventive compositions relative to that of a good Ba(Ti$_{0.915}$Zr$_{0.085}$)O$_3$ capacitor.
Figure 5B:
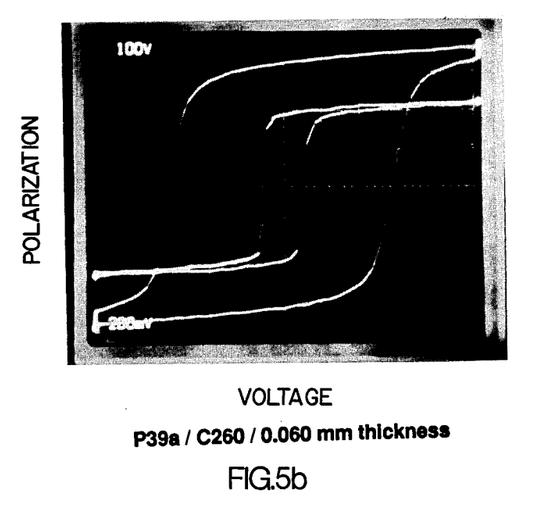
Figure 5C:
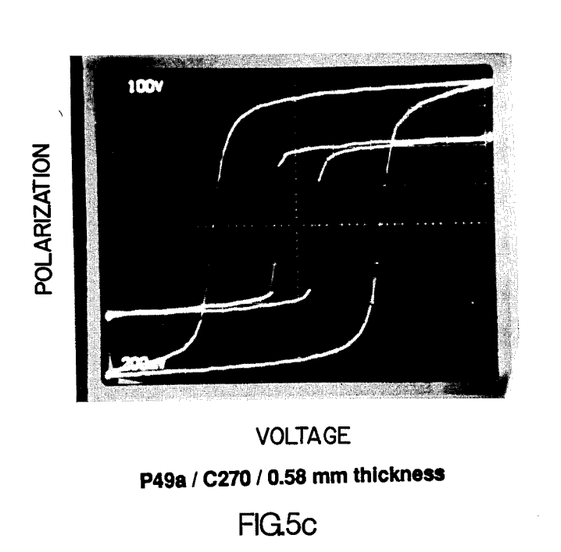
Figure 5D:
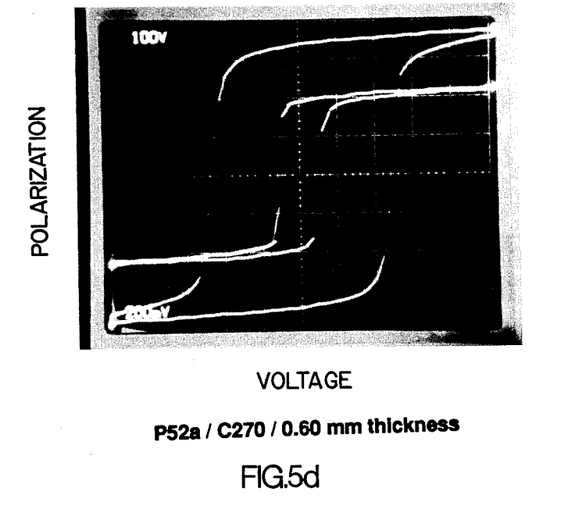

The capacitance versus temperature behavior of parts prepared from the various compositions were measured to identify their respective Curie temperatures, presumed to be identical to their peak permittivity temperatures. The peak permittivity temperature increased from 120° C. to 180° C. as the amount of PT in the composition increased from 25 m/o to 35 m/o, as shown in FIG. 4. In this temperature range, the substitution of PT for PMN causes a +4° to +6° C./(m/o) increase in the Curie temperature. The substitution of 3.0 m/o PMW for PMN, however, produces a −7° C. decrease in the Curie temperature for the 30 m/o PT composition or a change of −2.3° C./(m/o). All of the parts tested exhibited very high peak relative permittivity values, near 50,000, indicating good compositional homogeneity.

The room temperature polarization hysteresis loops generated by the ferroelectric ceramic capacitors prepared from the inventive compositions appear square and fairly similar, as shown in FIGS. 5a to 5d. These views represent composition P38a (FIG. 5a), P39a (FIG. 5b), P49a (FIG. 5c), and P52a (FIG. 5d) having a thickness of 0.68 mm; 0.60 mm; 0.58 mm; and, 0.60 mm, respectively. The compositions prepared with metal tungsten additions are squarer than those without these additions, but both the simpler compositions having PT mole fractions of 0.25, 0.30 and 0.35, designated respectively P37, P38 and P39, and those having 3.0 to 3.3 m/o divalent metal tungstate added, designated P52, P54 and P56, have acceptable polarization behavior for pulse generating operation. At room temperature, these materials have remanent polarization levels ranging from 0.27 coul/m$^2$ and coercive field levels of 3.1 to 5.1 KV/cm, depending on composition and firing conditions. Lower coercive field values are observed for parts having lower concentrations of PT, presumably because they have a rhombohedral crystal structure. A higher coercive field value of 5.1 KV/cm is observed for 0.35 PT mole fraction of composition P39 as well as for lower PT concentration parts fired at lower sintering temperatures.

The coercive voltage levels measured in the parts were also found to be dependent on whether the parts were coated with phenolic or left bare. Parts having 30 m/o PT added (P52a, P54a and b and P56a and b) had remanent polarization values of between 3.5 and 4.2 KV/cm before phenolic coating, but exhibited higher values between 4.5 and 5.2 KV/cm after they were coated with a phenolic resin loaded with marble dust. This increase in $E_c$ is presumably associated with a clamping of the parts by the stiff coating.

Figure 6:
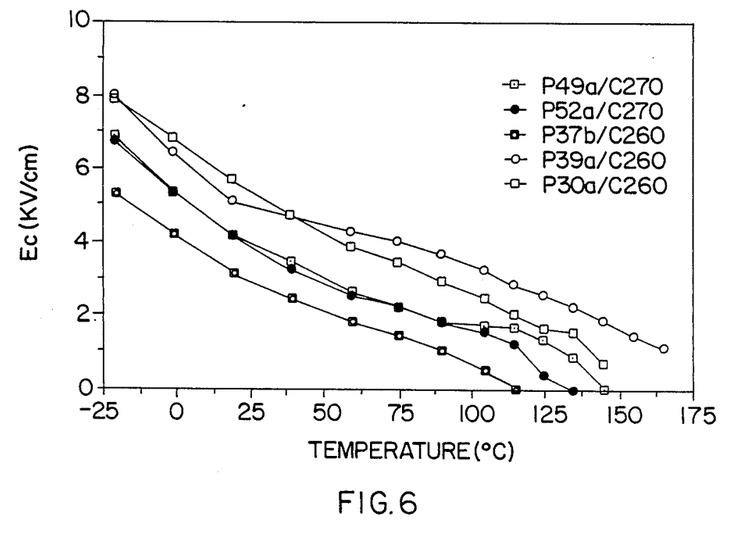
FIG. 6 is a graph of coercive field versus temperature for selected inventive compositions.

The polarization loop parameters of all compositions exhibited similar trends as temperature was increased. The coercive field values slowly decreased with increasing temperature, as illustrated in the graph of FIG. 6, decreasing more steeply at low temperatures and more gradually at higher temperatures. The coercive field levels for the rhombohederal compositions were noted to lie below that of a comparable PZT composition for all temperatures between −20° C. and 160° C. Although the Curie temperature of the PZT composition is about 20° C. higher than that of the P38 PMN-PT material, the same inequality in coercive field levels would hold if both materials were normalized to their respective Curie temperatures. The PMN-PT compositions having a 10 to 15% lower coercive field value at similar negative departures from their respective Curie temperatures.

Figure 7:
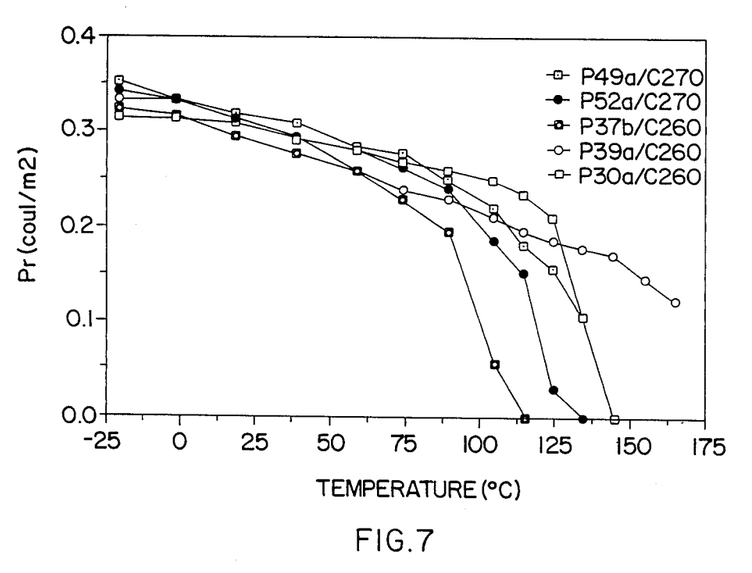
FIG. 7 is a graph plotting remanent polarization versus temperature for selected ones of the inventive compositions.

The remanent polarization levels for all of the compositions slowly decreased with increasing temperature until reaching about 25° C. below their respective Curie temperatures. At this point, the remanent polarization decreased more abruptly with increasing temperature, as illustrated in FIG. 7. At temperatures significantly below their Curie temperatures, a slope of about −0.001(coul/m$^2$)/°C. was observed for all PMN-PT materials. Within about 25° C. of their Curie temperatures a much steeper decrease of about −0.006(coul/m$^2$)/°C. was measured. This decline in polarization limits the pulse generation range of the materials to about 25° C. below the Curie temperature of the materials, and is suggestive of a first order phase transition.

The improved pulse generating properties derived from PMN-PT compositions modified with a divalent metal tungstate are primarily due to the improved polarization loop squareness produced by these additions. The tungstate additions do not increase the remanent polarization level, but do sharpen the loop shape. Without the tungstate additions, the slope of the polarization versus electric field loop at the coercive field points is in the range of 20 to 30, $\mu$coul/(KV-cm). With the additions, the slope of the polarization versus electric field loop at the coercive field points is increased to about 40 to 60 $\mu$coul/(KV-cm). In contrast, $BaTiO_3$-based parts have polarization versus electric field loop shapes in the range of 85 to 100$_u$ coul/(KV-cm) at room temperature, but have much lower remanent polarization levels, near 0.18 coul/m$^2$ versus 0.34 coul/m$^2$ for PMN-PT-based compositions of the invention.

The embodiments which have been described herein are but some of several which ultilize this invention and are set forth here by way of illustration but not of limitation. It is apparent that many other embodiments which will be readily apparent to those skilled in the art may be made without departing materially from the spirit and scope of this invention.

I claim:

1. An improved ferroelectric ceramic capacitor comprised of a nonlinear dielectric based upon materials in the $Pb(Mg_{0.33}Nb_{0.67})O_3$—$PbTiO_3$—$Pb(Me_{0.50}W_{0.50})O_3$ system, wherein Me represents a metal ion having a +2 valence.

2. A capacitor in accordance with claim 1 wherein Me represents Mg, Zn or Ni.

3. A capacitor prepared in accordance with claim 1 in which the finished product is potted in a phenolic resin prior to use in an electrical circuit.

4. An improved nonlinear dielectric composition based upon the general chemical formula:

$$u[Pb(Mg_{0.33}Nb_{0.67})O_3]+v[PbTiO_3]+w[Pb(Me_{0.50}W_{0.50})O_3],$$

wherein u, v and w denote the mole fractions of the stated compounds, and Me represents a metal ion having a +2 valence.

5. A composition in accordance with claim 4, in which $0.617 \leq u \leq 0.75$, $0.25 \leq v \leq 0.35$ and $0.00 = w \leq 0.033$, and Me represents Mg, Zn or Ni.

6. A composition in accordance with claim 5, in which $0.65 \leq u \leq 0.75$.

7. A composition in accordance with claim 4, in which the value of v is set as close to 0.35 m/o as possible without causing a change in crystal structure of the composition.

* * * * *